(12) United States Patent
Moad et al.

(10) Patent No.: US 8,080,613 B2
(45) Date of Patent: Dec. 20, 2011

(54) PROCESS FOR THE PREPARATION OF POLYOLEFIN NANOCAMPOSITES

(75) Inventors: Graeme Moad, Sassafras (AU); George Philip Simon, Glenhuntly (AU); Katherine Maree Dean, Collingwood (AU); Guoxin Li, Mulgrave (AU); Roshan Tyrrel Anton Mayadunne, Wheelers Hill (AU); Rudolf Pfaendner, Rimbach (DE); Hendrik Wermter, Bensheim (DE); Armin Schneider, Freiburg (DE)

(73) Assignee: Advanced Polymerik Pty Ltd, Notting Hill, Victoria (AU)

( * ) Notice: Subject to any disclaimer, the term of this patent is extended or adjusted under 35 U.S.C. 154(b) by 0 days.

(21) Appl. No.: 12/860,006

(22) Filed: Aug. 20, 2010

(65) Prior Publication Data

US 2010/0317786 A1    Dec. 16, 2010

Related U.S. Application Data

(63) Continuation of application No. 10/533,011, filed as application No. PCT/EP03/012204 on Nov. 3, 2003, now abandoned.

(30) Foreign Application Priority Data

Nov. 8, 2002 (EP) .................... 02405964

(51) Int. Cl.
*C08L 33/12* (2006.01)
*C08L 23/00* (2006.01)
*C08K 3/34* (2006.01)

(52) U.S. Cl. ....... 525/92 B; 525/92 R; 525/88; 525/418; 525/451; 524/444; 524/445; 524/442; 524/492; 524/582; 524/583; 524/584; 524/585; 524/586; 524/587

(58) Field of Classification Search ............. 524/492, 524/445, 442, 582, 585; 525/88, 92 B, 451
See application file for complete search history.

(56) References Cited

U.S. PATENT DOCUMENTS

| | | | |
|---|---|---|---|
| 4,017,452 A | 4/1977 | Schwarz | 260/42.14 |
| 4,338,228 A | 7/1982 | Inoue et al. | 524/120 |
| 4,481,322 A | 11/1984 | Godlewski et al. | 524/265 |
| 4,534,799 A | 8/1985 | Aguirre | 106/270 |
| 4,703,082 A | 10/1987 | Godlewski | |
| 5,851,682 A | 12/1998 | Kotani et al. | 428/500 |
| 5,912,292 A | 6/1999 | Sun | 524/301 |
| 5,939,184 A | 8/1999 | Inoue et al. | 428/331 |
| 5,973,053 A | 10/1999 | Usuki et al. | 524/445 |
| 6,087,433 A | 7/2000 | Hanada et al. | 524/492 |
| 6,150,450 A | 11/2000 | Sekiyama et al. | 524/441 |
| 6,238,793 B1 | 5/2001 | Takahashi et al. | 428/403 |
| 6,268,407 B1 | 7/2001 | Whitehouse et al. | 523/205 |
| 6,384,121 B1 | 5/2002 | Barbee et al. | 524/445 |
| 6,417,262 B1 | 7/2002 | Turner et al. | 524/445 |
| 6,465,543 B1 | 10/2002 | Alexandre et al. | 523/213 |
| 6,579,927 B1 * | 6/2003 | Fischer | 524/445 |
| 6,767,951 B2 * | 7/2004 | Nair et al. | 524/445 |
| 6,767,952 B2 * | 7/2004 | Dontula et al. | 524/445 |
| 6,770,697 B2 | 8/2004 | Drewniak et al. | |
| 6,864,308 B2 | 3/2005 | Rosenthal et al. | 524/445 |
| 7,071,247 B2 * | 7/2006 | Fischer et al. | 523/218 |
| 2003/0060556 A1 | 3/2003 | Fischer | 524/445 |
| 2003/0162878 A1 | 8/2003 | Fischer et al. | 524/445 |
| 2004/0110881 A1 | 6/2004 | Panek et al. | 524/284 |

FOREIGN PATENT DOCUMENTS

| | | |
|---|---|---|
| EP | 0705880 | 4/1996 |
| JP | 58-065723 | 4/1983 |
| JP | 10310704 | 11/1998 |
| JP | 2000239397 | 9/2000 |
| WO | 98/01503 | 1/1998 |
| WO | 99/07790 | 2/1999 |
| WO | 99/47598 | 9/1999 |
| WO | 00/34393 | 6/2000 |
| WO | 01/48080 | 7/2001 |
| WO | 01/85831 | 11/2001 |
| WO | 02/066553 | 8/2002 |

OTHER PUBLICATIONS

Liao et al., Polymer, 2001, 42, 10007-10011.*
Vaia et al., Chem. Mater. (1993), vol. 120, No. 2, pp. 1694-1696.
Liao et al., Polymer, vol. 42, (2001), pp. 10007-10011.
Kawasumi et al., Macromolecules, (1997), vol. 30, pp. 6333-6338.
Falbe et al., RÖMPP Chemie Lexikon, $9^{th}$ Ed., vol. 5, p. 3559, (1992).
D.P.N. Vlasveld et al., Polymer, vol. 46, (2005), pp. 3452-3461.
Southern Clay Products, Product Bulletin, Cloisite® 20A.
Southern Clay Products, Product Bulletin, Cloisite® $Na^+$.
English Language abstract of JP10310704 from the esp@cenet web site printed on Dec. 10, 2009.
English Language abstract of JP2000239397 from the esp@cenet web site printed on Dec. 10, 2009.
Taiwanese Search Report.

* cited by examiner

*Primary Examiner* — Rip A. Lee
(74) *Attorney, Agent, or Firm* — LeClairRyan, a Professional Corporation

(57) ABSTRACT

The instant invention discloses a process for the preparation a polyolefin nanocomposite which comprises melt mixing a mixture of a polyolefin, a filler and a non-ionic surfactant.

13 Claims, No Drawings

PROCESS FOR THE PREPARATION OF POLYOLEFIN NANOCAMPOSITES

This application is a continuation of U.S. application Ser. No. 10/533,011, filed Apr. 07, 2006, now abandoned, which is a national stage of PCT/EP 03/12204, filed Nov. 3, 2003, the contents of which are incorporated by reference.

The present invention relates to a novel process for the preparation of a polyolefin nanocomposite which comprises melt mixing a mixture of a polyolefin, a filler and a non-ionic surfactant. A further embodiment of the present invention is the use of a non-ionic surfactant to intercalate and exfoliate a filler and disperse the filler in a polyolefin matrix to form a nanocomposite. A further embodiment of the present invention is a nanocomposite comprising a) a polyolefin which is susceptible to oxidative, thermal or light-induced degradation, b) a filler, c) a non-ionic surfactant, and d) an additive selected from the group consisting of phenolic antioxidants, light-stabilizers, processing stabilizers, pigments, dyes, plasticizers, compatibilizers, toughening agents, thixotropic agents, levelling assistants, acid scavengers and metal passivators or mixtures thereof.

There is a substantial recent literature on organic-inorganic nanocomposites based on clays or layered silicates such as montmorillonite and synthetic polymers. Polyolefin nanocomposites have been prepared from organic modified clays. The clays used are generally modified with long chain alkyl or dialkyl ammonium ions or amines or in a few cases other onium ions, like for example phosphonium. The ammonium ion/amine additives are usually incorporated into the clay structure by a separate intercalation step.

These conventional organic modified clays have a number of disadvantages when used for the preparation of polyolefin nanocomposites. Ammonium salts are thermally unstable at temperatures used in polyolefin processing or may be otherwise reactive under processing conditions. The clays cannot be directly dispersed into commercial polyolefins to form stable nanocomposites. Although, there are a few reports that such organic modified clays may be directly dispersed into polyolefins to form nanocomposites by intensive mixing. However, the exfoliated structures formed in this way are generally thought not to be stable and may reaggregate during subsequent melt processing operations like for example injection moulding.

Polyolefin nanocomposite formation by melt processing has thus required use of an additional additive, most often a polypropylene-graft-maleic anhydride, which in working examples is present as one of the major component of the final product.

A. Okada et al., Macromolecules 1997, 30, 6333-6338 or U.S. Pat. No. 5,973,053 disclose that a polypropylene nanocomposite is obtained when a clay, premodified with octadecylammonium salts, is compounded with polypropylene in the presence of polyolefin oligomers containing polar functionality, for example polypropylene-graft-maleic anhydride.

U.S. Pat. No. 5,939,184 discloses the formation of polypropylene nanocomposites based on alkyl ammonium modified clays and a polar graft polyolefin or an olefin copolymer which is typically used in excess of the amount of clay.

WO-A-99/07790 discloses a nanocomposite material on the basis of a clay having a layered structure and a cation exchange capacity of from 30 to 250 milliequivalents per 100 gram, a polymeric matrix and a block copolymer or a graft copolymer, which block copolymer or graft copolymer comprises one or more first structural units (A), which are compatible with the clay, and one or more second structural units (B), which are compatible with the polymeric matrix. Specific examples of such block copolymers are block copolymers consisting of one polyethylene oxide block (PEO) and one polystyrene block (PS); one poly-4-vinylpyridine block (P4VP) and one polystyrene block (PS); one dendritic polyethylenimine block (dend-$P_8$ PEI) and one poylstyrene block (PS); or a multiblock copolymer consisting of one dendritic polyethylenimine core block (dend$_{16}$) functionalized with 16 octadecyl groups (block B, PE-compatible).

WO-A-00/34393 discloses a polymer-clay nanocomposite comprising (i) a melt-processible matrix polymer, (ii) a layered clay material, and (iii) a matrix polymer-compatible functionalized oligomer or polymer. A specifically disclosed example of component (iii) is for example an ammonium functionalized polycaprolactone.

WO-A-01/48080 discloses polyolefin nanocomposites based on the use of cation exchanged clay and a high molecular weight polypropylene graft maleic anhydride.

WO-A-01/85831 discloses polyolefin nanocomposites based on the use of cation exchanged clay and a polyolefin graft organic cation like for example an ammonium ion.

The use of a poly(ethylene oxide)-block-polyethylene in the preparation of a low density polyethylene nanocomposite is described by B. Liao et al. in Polymer 42, 10007-10011 (2001). These authors make no mention of the utility of the blocks in one step nanocomposite formation.

WO-A-02/00776 relates to a porous mold for use in a pressure casting process, which mold is manufactured of a polymeric material forming a matrix into which a clay and a block copolymer or a graft copolymer have been incorporated, wherein the block copolymer or graft copolymer comprises one or more first structural units (A), which are compatible with the clay, and one or more second structural units (B), which are compatible with the polymeric matrix for the manufacture of a porous filter material. A specifically disclosed example of such a block copolymer is a block copolymer consisting of one polyethylene oxide block (PEO) and one poly(methylmethacrylate) block (PMMA).

These known methods using organically (ammonium or amine) modified clays for the preparation of polyolefin nanocomposites do not in every respect satisfy the high requirements to be met, especially with regards to polyolefin mouldings which are subject to oxidative, thermal or light-induced degradation. Further properties of interest include improved heat distortion temperature, improved fire retardancy, improved gas barrier, enhanced stiffness, improved visual appearance and dimensional stability.

There is therefore still a need to find an efficient process for the preparation of polyolefin nanocomposites that provide the properties of interest but do not have the disadvantages mentioned above and which allows the use of a natural filler which has not been modified before use.

The present invention therefore relates to a process for the preparation of a polyolefin nanocomposite which comprises melt mixing a mixture of a) a polyolefin, b) a filler and c) a non-ionic surfactant.

The incorporation can be carried out in any heatable container equipped with a stirrer, for example in a closed apparatus such as a kneader, mixer or stirred vessel. The incorporation is preferably carried out in an extruder or in a kneader. It is immaterial whether processing takes place in an inert atmosphere or in the presence of oxygen.

The addition of components (a), (b) and (c) can be carried out in all customary mixing machines in which the polymer is melted and mixed with the additives. Suitable machines are known to those skilled in the art. They are predominantly mixers, kneaders and extruders. The process is preferably carried out in an extruder by introducing the additive during processing. Particularly preferred processing machines are single-screw extruders, contrarotating and corotating twin-screw extruders, planetary-gear extruders, ring extruders or cokneaders. It is also possible to use processing machines provided with at least one gas removal compartment to which a vacuum can be applied. Suitable extruders and kneaders are described, for example, in Handbuch der Kunststoffextrusion, Vol. 1, Grundlagen, Editors F. Hensen, W. Knappe, H. Potente, 1989, pp. 3-7, ISBN:3-446-14339-4; and Vol. 2 Extrusionsanlagen 1986, ISBN 3-446-14329-7. For example, the screw length is 1-60 screw diameters, preferably 35-48 screw diameters. The rotational speed of the screw is preferably 10 to 600 rotations per minute (rpm), for example 25-300 rpm. The maximum throughput is dependent on the screw diameter, the rotational speed and the driving force. The process of the present invention can also be carried out at a level lower than maximum throughput by varying the parameters mentioned or employing weighing machines delivering dosage amounts. If a plurality of components are added, these can be premixed or added individually.

Of interest is a process for the preparation of a polyolefin nanocomposite, wherein the filler is a natural or synthetic phyllosilicate or a mixture of such phyllosilicates or a layered hydroxycarbonate. Preferably, the filler is a layered silicate clay or a layered hydroxycarbonate. Of special interest is a process for the preparation of a polyolefin nanocomposite, wherein the filler is a montmorillonite, bentonite, beidellite, mica, hectorite, saponite, nontronite, sauconite, vermiculite, ledikite, magadite, kenyaite, stevensite, volkonskoite, hydrotalcite or a mixture thereof.

Compounds from the series consisting of layered hydroxycarbonates such as hydrotalcites can be described by the general formula III, $$M^{2+}_{1-x}\cdot M^{3+}_{x}\cdot(OH)_2\cdot(A^{y-})_{x/y}\cdot pH_2O \quad \text{(III)}$$

where
$M^{2+}$=Mg, Ca, Sr, Zn, Sn and/or Ni,
$M^{3+}$=Al, B or Bi,
$A^{y-}$ is an anion having the valency y,
y is a number from 1 to 4,
x is a number from 0 to 0.5 and
p is a number from 0 to 20.

Further examples are given for example in DE-A-4 106 403.

$A^{y-}$ is preferably $OH^-$, $Cl^-$, $Br^-$, $I^-$, $HCO_3^-$, $CH_3COO^-$, $C_6H_5COO^-$, $CO_3^{2-}$, $SO_4^{2-}$, $(^-OOC-COO^-)$, $(CHOHCOO)_2^{2-}$, $(CHOH)_4CH_2OHCOO^-$, $C_2H_4(COO)_2^{2-}$, $(CH_2COO)_2^{2-}$, $CH_3CHOHCOO^-$, $SiO_3^{2-}$, $SiO_4^{4-}$, $Fe(CN)_6^{3-}$, $Fe(CN)_6^{4-}$ oder $HPO_4^{2-}$.

Other hydrotalcites which can preferably be used are compounds having the general formula IIIa, $$M^{2+}_x\cdot Al_2\cdot(OH)_{2x+6yz}\cdot(A^{y-})_2\cdot pH_2O \quad \text{(IIIa)}$$

wherein $M^{2+}$ is at least one metal from the series consisting of Mg and Zn, preferably Mg, $A^{y-}$ is an anion, for example from the series consisting of $CO_3^{2-}$, $(^-OOC-COO^-)$, $OH^-$ and $S^{2-}$ where y is the valency of the anion, p is a positive number, preferably from 0.5 to 15, and x and z are positive numbers, x preferably being from 2 to 6 and z preferably being less than 2.

Preference is given to compounds from the series consisting of the hydrotalcites of the general formula III, $$M^{2+}_{1-x}\cdot M^{3+}_x\cdot(OH)_2\cdot(A^{y-})_{x/y}\cdot pH_2O \quad \text{(III)}$$

where $M^{2+}$ is Mg or a solid solution of Mg and Zn, $A^{y-}$ is $CO_3^{2-}$, x is a number from 0 to 0.5 and p is a number from 0 to 20.

Very particular preference is given to hydrotalcites of the formulae $Al_2O_3\cdot 6MgO\cdot CO_2\cdot 12H_2O$, $Mg_{4.5}Al_2(OH)_{13}\cdot CO_3\cdot 3,5H_2O$, $4MgO\cdot Al_2O_3\cdot CO_2\cdot 9H_2O$, $4MgO\cdot Al_2O_3\cdot CO_2\cdot 6H_2O$, $ZnO\cdot 3MgO\cdot Al_2O_3\cdot CO_2\cdot 8\text{-}9H_2O$ or $ZnO\cdot 3MgO\cdot Al_2O_3\cdot CO_2\cdot 5\text{-}6H_2O$.

Of interest is a process for the preparation of a polyolefin nanocomposite, wherein the non-ionic surfactant is a linear non-ionic surfactant.

Likewise of interest is a process for the preparation of a polyolefin nanocomposite, wherein the non-ionic surfactant is a block or graft copolymer containing a hydrophilic or "clayophilic" and a hydrophobic segment(s) which do not contain an onium functionality.

Preferably, a hydrophilic or "clayophilic" segment comprises multiple polar groups such as ether [—O—], amide

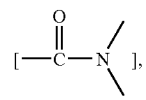

thioamide

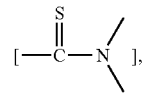

nitrile and hydroxy in appropriate proximity. Examples of such block grafts are poly(ethylene oxide), poly(vinyl pyrrolidone), polyacrylamide, polyacrylonitrile or poly(vinyl alcohol).

Preferably, a hydrophobic segment is "polyolefin-philic" characterized by being miscible or compatible with the polyolefin matrix phase such as a hydrocarbon segment. Alternatively, the hydrophobic segment is incompatible with the polyolefin and comprises a non-aggregating material such as a fluorocarbon, a siloxane segment or a low molecular weight methacrylate.

Of special interest is a process for the preparation of a polyolefin nanocomposite, wherein the non-ionic surfactant is a block or graft copolymer containing hydrophilic and hydrophobic segment(s) which do not contain an onium functionality, and the hydrophilic segment is a poly(ethylene oxide) block and the hydrophobic segment is a branched or unbranched polyolefin, a fluorocarbon, a siloxane or a low molecular weight methacrylate.

Also of interest is a process for the preparation of a polyolefin nanocomposite, wherein the non-ionic surfactant is a block or graft copolymer containing hydrophilic and hydrophobic segment(s) which do not contain an onium functionality, and the hydrophilic segment is a poly(ethylene oxide) block and the hydrophobic segment is a branched or unbranched polyolefin.

Likewise of special interest is a process for the preparation of a polyolefin nanocomposite, wherein the non-ionic surfactant is a sorbitan ester, a dimethylsiloxane-ethylene oxide-block copolymer, a poly(methyl methacrylate)-block-poly(oxyethylene) copolymer or a compound of the formula I

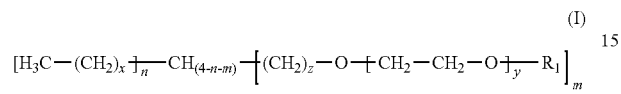

wherein m is 1 or 2, n is 1 or 2, x is greater than or equal to 1, y is greater than or equal to 1, z is greater than or equal to 0, and $R_1$ is hydrogen or $C_1$-$C_{25}$alkyl.

The compounds of the formula I are symmetrical or asymmetrical. This means that, if n is 2, "x" may be identical or different to the "x" in the other residue.

Alkyl having up to 25 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl or octadecyl.

Preferred compounds of the formula I are linear polyethylene-block-poly(ethylene oxides) of the formula I, wherein m is 1, n is 1, x is 8 to 50, y is 1 to 32, z is 0, and $R_1$ is hydrogen.

Many of these preferred linear polyethylene-block-poly(ethylene oxides) are commercially available like for example Aldrich polyethylene-block-poly(ethylene oxide) MW 1400 (average x is 50; average y is 15); Aldrich polyethylene-block-poly(ethylene oxide) MW 875 (average x is 50; average y is 4); Aldrich polyethylene-block-poly(ethylene oxide) MW 920 (average x is 32; average y is 10); Aldrich polyethylene-block-poly(ethylene oxide) MW 575 (average x is 33; average y is 2-3); Nafol 1822+2E0 (average x is 20; average y is 2).

Especially preferred compounds of the formula I are polyethylene-block-poly(ethylene oxides) of the formula I such as for example the compounds of the formula Ia, Ib, Ic, Id or Ie which are accessible according to known literature methods, referenced as DAB25, DAB50, Aduxol GA7-02, Aduxol GA8-03 and Aduxol GA10-03.

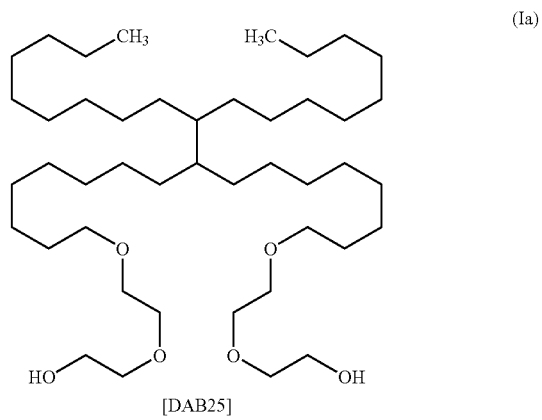

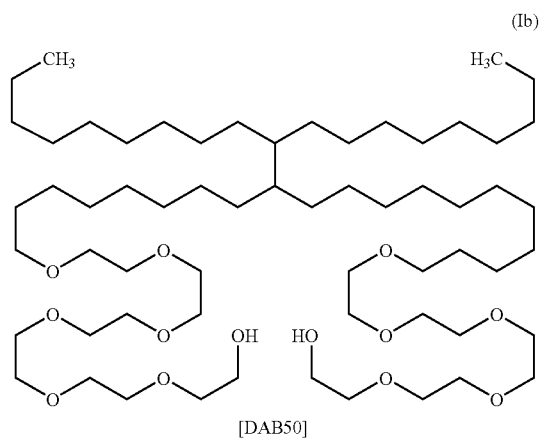

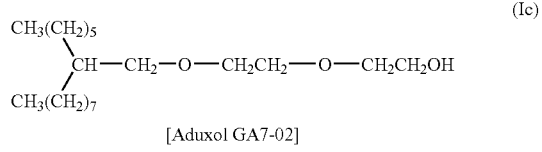

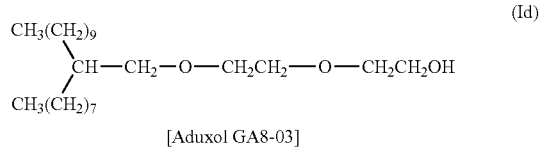

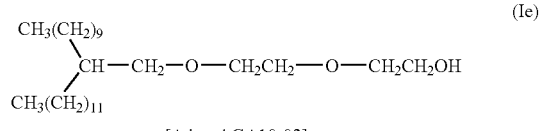

Preferred sorbitan esters are esters of sorbitol or an ethoxylated sorbitan with a $C_{12}$-$C_{25}$carboxylic acid.

Examples of $C_{12}$-$C_{25}$carboxylic acids are lauric acid, oleic acid, palmitic acid or stearic acid. Esters of these carboxylic acids with sorbitol are commercially available from Fluka (Switzerland) as Span 20® [sorbitan monolaurate], Span 40® [sorbitan monopalmitate], Span 60® [sorbitan monostearate], Span 65® [sorbitan tristearate], Span 80® [sorbitan monooleate] or Span 85® [sorbitan trioleate].

A preferred ester of an ethoxylated sorbitan with a $C_{12}$-$C_{25}$carboxylic acid is for example the compound of the formula II

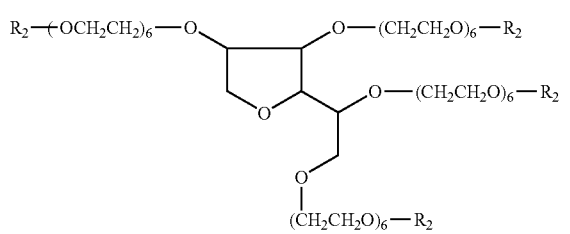
(II)

wherein $R_2$ is $C_{12}$-$C_{25}$alkanoyl or $C_{12}$-$C_{25}$alkenoyl.

Alkanoyl having 12 to 25 carbon atoms is a branched or unbranched radical, for example, dodecanoyl, tridecenoyl, tetradecanoyl, pentadecanoyl, hexadecanoyl, heptadecanoyl, octadecanoyl, icosanoyl or docosanoyl. Preference is given to alkanoyl having from 14 to 18 carbon atoms. Special preference is given to octadecanoyl (stearoyl).

Alkenoyl having 12 to 25 carbon atoms is a branched or unbranched radical comprising one or more carbon-carbon double bonds, for example, dodecenoyl, tridecenoyl, tetradecenoyl, pentadecenoyl, hexadecenoyl, heptadecenoyl or octadecenoyl. Preference is given to alkenoyl having from 14 to 18 carbon atoms. Special preference is given to octadecenyl (oleyl).

Fluorocarbons of special interest are for example semifluorinated surfactants like for example Du Pont Zonyl® fluorosurfactans. Examples of such compounds are Zonyl FSA® [$R_F$CH$_2$CH$_2$SCH$_2$CH$_2$CO$_2$Li]; Zonyl FSN®[$R_F$CH$_2$CH$_2$—O—(CH$_2$CH$_2$)$_x$H]; or Zonyl TBS® [$R_F$CH$_2$CH$_2$SO$_3$Y], wherein $R_F$ is F(CF$_2$CF$_2$)$_{3-8}$, and Y is hydrogen.

Siloxanes of special interest are for example polysiloxanes like for example those disclosed in Table A.

TABLE A

Examples of polysiloxanes

| Code | Structure |
|---|---|
| DBE-224 | PDMS-PEO block (75/25) |
| DBE-712 | PDMS-PEO block (25/75) |
| DBE-814 | PDMS-PEO block (20/80) |
| DBE-821 | PDMS-PEO block (15/85) |
| DBP-732 | PDMS-(PPO/60-PEO/40) block (30/70) |
| DMS-E12 | EPCH$_2$O(CH$_2$)$_3$-PDMS-(CH$_2$)$_3$OCH$_2$EP (EPOXYPROPOXYPROPYL TERMINATED POLYDIMETHYLSILOXANE) |
| DMS-E21 | EPCH$_2$O(CH$_2$)$_3$-PDMS-(CH$_2$)$_3$OCH$_2$EP |
| DMS-A12 | H$_2$N(CH$_2$)$_3$-PDMS-(CH$_2$)$_3$NH$_2$ |
| DMS-A21 | H$_2$N(CH$_2$)$_3$-PDMS-(CH$_2$)$_3$NH$_2$ |

PDMS is polydimethylsiloxane.
PEO is polyethylene oxide.
EPCH$_2$O is epoxypropoxy.
PPO is polypropylene oxide.

Illustrative Examples of Polyolefins are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
 a) radical polymerisation (normally under high pressure and at elevated temperature).
 b) catalytic polymerisation using a catalyst that normally contains one or more than one metal of groups IVb, Vb, Vlb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3, Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

Preferably, the polyolefin is polyethylene or polypropylene or copolymers thereof.

Of interest is a process for the preparation of a polyolefin nanocomposite, wherein the filler is present in an amount of from 1 to 15%, preferably 1 to 10%, based on the weight of the polyolefin.

Also of interest is a process for the preparation of a polyolefin nanocomposite, wherein the non-ionic surfactant is present in an amount of from 0.1 to 7.5%, preferably 0.1 to 5%, based on the weight of the polyolefin.

Likewise of interest is a process for the preparation of a polyolefin nanocomposite, wherein the melt mixing of the components (polyolefin, filler and non-ionic surfactant)

occurs between 120 and 290° C., preferably between 140 and 250° C., for example between 170 and 230° C.

The present process may comprise in addition, besides components (a), (b) and (c), further additives.

For example, the process of the invention may optionally also contain from 0.01 to 10%, preferably from 0.025 to 5%, and especially from 0.1 to 3% by weight of various conventional stabilizer coadditives, such as the materials listed below, or mixtures thereof.

1, Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl) phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydrooxy-phenyl)adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-isulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyphenol), 2,2'-ethylidenebis(6-tert-butyl-4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methylenebis-(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydrooxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra (5-tert-butyl-4-hydroxy-2-methylphenyl)pentane.

1.7. O-, N- and S-benzyl compounds, for example 3,5,3', 5'-tetra-tert-butyl-4,4'-dihydroxydibenzyl ether, octadecyl-4-hydroxy-3,5-dimethylbenzylmercaptoacette, tridecyl-4-hydroxy-3,5-di-tert-butyl benzyl mercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4, 6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzyl phosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12, Acylaminophenols, for example 4-hydroxylauranilide, 4-hydroxystearanilide, octyl N-(3,5-di-tert-butyl-4-hydroxyphenyl)carbamate.

1.13, Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane: 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-disec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tent-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethyl hexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)

sebacate, bis(1,2,2,6,6-pentamethyl-4-piperidyl) n-butyl-3, 5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro[4,5]decane and epichlorohydrin, 1,1-bis(1,2,2,6,6-pentamethyl-4-piperidyloxycarbonyl)-2-(4-methoxyphenyl)ethene, N,N'-bisformyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethyl phenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-ten-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxyylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc, dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example, inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol and 1,3:2,4-di (benzylidene)sorbitol.

12. Other additives, for example, plasticisers, lubricants, emulsifiers, pigments, rheology additives, catalysts, flow-control agents, optical brighteners, flameproofing agents, antistatic agents and blowing agents.

13. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

Of special interest is a process for the preparation of polyolefin nanocomposites which comprises as further additives phenolic antioxidants, light-stabilizers, processing stabilizers, pigments, dyes, plasticizers, compatibilizers, toughening agents, thixotropic agents, levelling assistants, acid scavengers and/or metal passivators. Preferably, further additives are phenolic antioxidants, light-stabilizers and processing stabilizers.

The mixing of components (a) (b) and (c) and optionally further additives is done by commonly used techniques such as roll-milling, mixing in a Banbury type mixer, or mixing in an extruder barrel and the like.

X ray diffraction analysis shows that the non-ionic surfactants interact with the filler like for example the layered silicate clays. The non-ionic surfactants intercalate and partially exfoliate the clay structure when added to the clay in a polyolefin melt. Most importantly, there is no requirement to preintercalate the clay with an additive.

The polyolefin nanocomposites obtained according to the process of the present invention possess properties and applications associated with polyolefin nanocomposites. These properties include improved heat distortion temperature, improved fire retardancy, improved gas barrier, enhanced stiffness and dimensional stability, and improved mechanical properties like for example higher tensile modulus and a tensile strength which are similar or higher than a polyolefin matrix phase alone. The polyolefin nanocomposites obtained according to the process of the present invention possess also improved homogeneity and/or transparency, and improved wettability which improves dyeability or printability of the polyolefin.

Polyolefin nanocomposites obtained by a process according to the present invention possess the above mentioned physical properties and improved long-term thermal stability and higher elongation at break when compared to conventional nanocomposites which are for example ammonium modified clays.

Of interest is a process for the preparation of a polyolefin nanocomposite which comprises melt mixing a mixture of a polyolefin, a filler and a non-ionic surfactant, wherein the filler is an unmodified filler.

The mixture of the filler and the non-ionic surfactant, and where applicable further additives, may also be added to the polyolefin in the form of a master batch that contains the mixture in a concentration of, for example, from 2.5 to 40% by weight. This master batch is then heated with a polyolefin to form a polyolefin nanocomposite.

An embodiment of the present invention is therefore also a process for the preparation of a polyolefin nanocomposite which comprises melt mixing a mixture of a) a polyolefin, b) a filler and c) a non-ionic surfactant, wherein the mixture of the filler and the non-ionic surfactant, and where applicable further additives, are added to the polyolefin in the form of a master batch which contains the mixture in a concentration of from 2.5 to 40% by weight.

Preferably the filler and the non-ionic surfactant, and where applicable further additives, are precompounded before melt blending with a polyolefin.

The present invention also relates to polyolefin nanocomposites obtained by melt mixing a mixture of a polyolefin, a filler and a non-ionic surfactant.

A further embodiment of the present invention is a nanocomposite comprising
  a) a polyolefin which is susceptible to oxidative, thermal or light-induced degradation,
  b) a filler,
  c) a non-ionic surfactant, and
  d) an additive selected from the group consisting of phenolic antioxidants, light-stabilizers, processing stabilizers, pigments, dyes, plasticizers, compatibilizers, toughening agents, thixotropic agents, levelling assistants, acid scavengers and metal passivators or mixtures thereof.

Preferably, component (d) is a phenolic antioxidant, light-stabilizer, processing stabilizer and metal passivator or mixtures thereof.

The preferred non-ionic surfactants, fillers and polyolefins are the same as those described in the process for the preparation of the polyolefin nanocomposites.

The polyolefin nanocomposites according to the invention may be used in an extremely wide variety of forms, e.g. in the form of films, fibres, tapes, moulding compounds or profiles, or as binders for surface-coatings, especially powder coatings, adhesives or cements.

The polyolefin nanocomposites according to the invention may likewise be used in an extremely wide variety of forms, especially in the form of thick-layer polyolefin moulded articles that are in lasting contact with extracting media, such as, for example, pipes for liquids or gases, films, fibres, geomembranes, tapes, profiles or tanks.

The polyolefin nanocomposites according to the invention can be advantageously used for the preparation of various shaped articles. Examples are:

I-1) Floating devices, marine applications, pontoons, buoys, plastic lumber for decks, piers, boats, kayaks, oars, and beach reinforcements.

I-2) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-3) Road traffic devices, in particular sign postings, posts for road marking, car accessories, warning triangles, medical cases, helmets, tires.

I-4) Devices for plane, railway, motor car (car, motorbike) including furnishings.

I-5) Devices for space applications, in particular rockets and satellites, e.g. reentry shields.

I-6) Devices for architecture and design, mining applications, acoustic quietized systems, street refuges, and shelters.

II-1) Appliances, cases and coverings in general and electric/electronic devices (personal computer, telephone, portable phone, printer, television-sets, audio and video devices), flower pots, satellite TV bowl, and panel devices.

II-2) Jacketing for other materials such as steel or textiles.

II-3) Devices for the electronic industry, in particular insulation for plugs, especially computer plugs, cases for electric and electronic parts, printed boards, and materials for electronic data storage such as chips, check cards or credit cards.

II-4) Electric appliances, in particular washing machines, tumblers, ovens (microwave oven), dish-washers, mixers, and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts.

III-3) Sanitary articles, in particular shower cubicles, lavatory seats, covers, and sinks.

III-4) Hygienic articles, in particular diapers (babies, adult incontinence), feminine hygiene articles, shower curtains, brushes, mats, tubs, mobile toilets, tooth brushes, and bed pans.

III-5) Pipes (cross-linked or not) for water, waste water and chemicals, pipes for wire and cable protection, pipes for gas, oil and sewage, guttering, down pipes, and drainage systems.

III-6) Profiles of any geometry (window panes) and siding.

III-7) Glass substitutes, in particular extruded plates, glazing for buildings (monolithic, twin or multiwall), aircraft, schools, extruded sheets, window film for architectural glazing, train, transportation, sanitary articles, and greenhouse.

III-8) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles.

III-9) Intake and outlet manifolds.

III-10) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

IV-2) Woven fabrics continuous and staple, fibers (carpets/hygienic articles/geotextiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags.

IV-3) Membranes, insulation, covers and seals for roofs, tunnels, dumps, ponds, dumps, walls roofing membranes, geomembranes, swimming pools, curtains (shades)/sunshields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

V) Films (packaging, dump, laminating, agriculture and horticulture, greenhouse, mulch, tunnel, silage), bale wrap, swimming pools, waste bags, wallpaper, stretch film, raffia, desalination film, batteries, and connectors.

VI-1) Food packing and wrapping (flexible and solid), bottles.

VI-2) Storage systems such as boxes (crates), luggage, chest, household boxes, pallets, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play vehicles.

VII-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china clay (kaolin), wollastonite, pigments, carbon black, $TiO_2$, mica, nanocomposites, dolomite, silicates, glass, asbestos).

Thus, a further embodiment of the present invention relates to articles, in particular films, pipes, tapes, profile, bottles, tanks or containers, fibers, moulding compounds, binders for surface coatings, especially powder coatings, adhesives or cements containing a polyolefin nanocomposite as described above.

A film as barrier material is preferred. The film can be prepared as a blown film cast film or via extrusion coating.

A further embodiment of the present invention relates to a molded article containing a polyolefin nanocomposite as described above. The molding is in particular effected by injection, blow, compression, roto-molding or slush-molding or extrusion.

A preferred embodiment of the present invention is likewise the use of a non-ionic surfactant to intercalate and exfoliate a filler and disperse the filler in a polyolefin matrix to form a nanocomposite.

The preferred non-ionic surfactants, fillers and polyolefins are the same as those described in the process for the preparation of the polyolefin nanocomposites.

The following examples illustrate the invention further. Parts or percentages relate to weight.

EXAMPLE 1

Preparation of Polypropylene Nanocomposites in a Batch Mixer 50 g of polypropylene [Basell KY 6100®], is blended with 0.25% of Irganox 1010® (pentaerythritol tetrakis[3-(3,5-di-tert-butyl-4-hydroxyphenyl)propionate]) and 0.25% of Irgafos 168® (tris(2,4-di-tert-butylphenyl)phosphite), 5% of a montmorillonite clay [Cloisite (Na+)®  obtained from Southern Clay Industries] and 2.5% of a non-ionic surfactant according to Table 1 in a plastic cup and then added to a batch mixer operating at 25 rpm and 180° C., the mixture is then taken to 50 rpm for 10 minutes. Small scale infection moulding is performed with a CS-183MMX Minimax moulder. The mixing chamber is preheated to 230° C. and the mould is oven heated to 120° C. for one hour prior to injection moulding. Approximately 5 g of the material is placed in the mixing chamber and heated for 4 to 5 minutes. A small shot was taken form the CS-183 MMX Minimax moulder prior to placing the mould in position. Six tensile bars with the dimensions 18 mm by 5 mm by 0.85 mm are produced for each of the 5 g material.

Tensile testing is performed according to ASTM D 638 with a Rheometrics mini material tensile tester [Minimat 2000®] equipped with a 1000 N load cell (40 mm/min). The results are summarized in Table 1.

TABLE 1

| Example | Non-ionic surfactant | d-001 in Å[c] | Normalized Modulus of Elasticity[e] |
|---|---|---|---|
| 1a[a] | none | 10 | 1.12 |
| 1b[b] | Nafol 1822 + 2EO[d] | 13 | 1.16 |
| 1c[b] | PE-b-PEO (MW 920)[f] | 17 | 1.25 |
| 1d[b] | PE-b-PEO (MW 1400)[g] | 14 | 1.20 |
| 1e[b] | Aduxol GA8-03[h] | 13.4 | 1.16 |
| 1f[b] | Aduxol GA10-03[i] | 13.3 | 1.20 |
| 1g[b] | Aduxol GA7-02[j] | 13.7 | 1.11 |
| 1h[b] | DAB25[k] | 13.6 | 1.16 |
| 1i[b] | DAB50[l] | 14.7 | 1.20 | a) Comparative Example.
b) Example according to the invention.
c) Interlayer distance determined by X-ray diffraction.
d) Nafol 1822+2EO is a linear polyethylene-block-poly(ethylene oxide) of Formula I

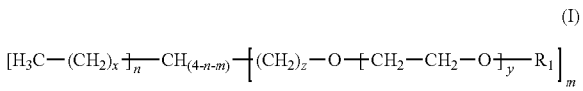

wherein m is 1, n is 1, average x is 20, average y is 2, z is 0, and $R_1$ is hydrogen.

e) Normalized modulus of elasticity relative to polypropylene processed under similar conditions (=1.0).

f) PE-b-PEO (MW 920)® is a linear polyethylene-block-poly(ethylene oxide) of the formula I, wherein m is 1, n is 1, average x is 32, average y is 10, z is 0, and $R_1$ is hydrogen.

g) PE-b-PEO (MW 1400)® is a linear polyethylene-block-poly(ethylene oxide) of the formula I, wherein m is 1, n is 1, average x is 50, average y is 15, z is 0, and $R_1$ is hydrogen.

h) Aduxol GA8-03® is a compound of the formula Id

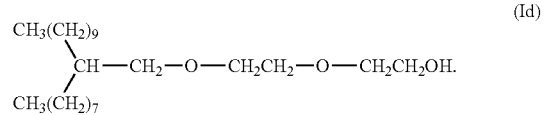

i) Aduxol GA10-03® is a compound of the formula Ie

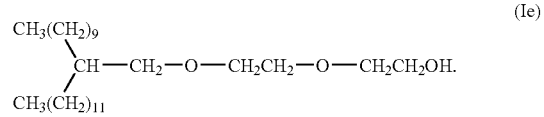

j) Aduxol GA7-02® is a compound of the formula Ic

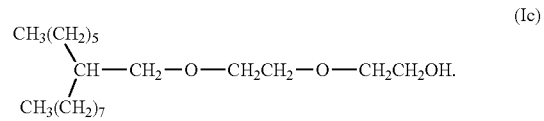

k) DAB25® is a compound of the formula Ia

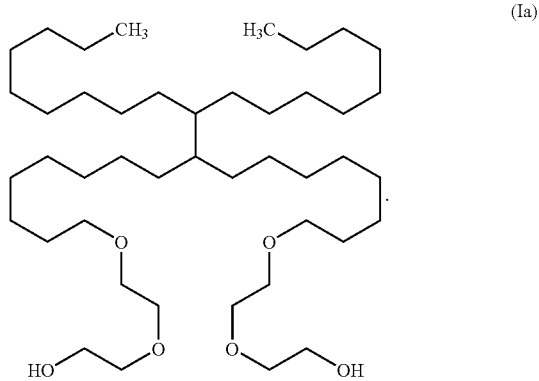

(Ia)

l) DAB50® is a compound of the formula Ib

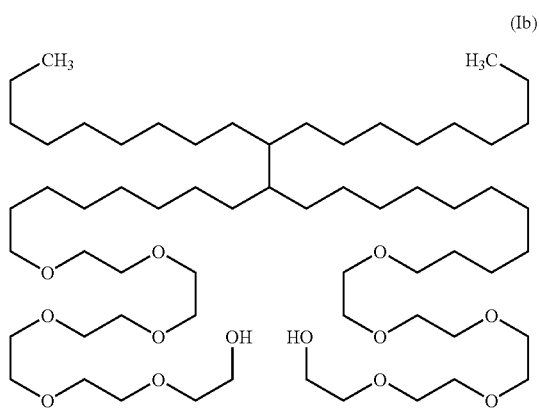

(Ib)

The X-ray diffraction (XRD) spectra show that all non-ionic surfactants according to Table 1 intercalate the used clay in the direct melt blending experiments in the batch mixer. This is demonstrated by an increase in d-spacing—the spacing between clay layers—from 10 Å to 13-17 Å. The elasticity modulus of samples is enhanced 4-25% over polypropylene.

EXAMPLE 2

Preparation of Polypropylene Nanocomposites in a Batch Mixer

Nanocomposites are prepared as described in Example 1 but with 2.5% of a non-ionic surfactant according to Table 2.

TABLE 2

| Example | Non-ionic surfactant | d-001 in Å[c] | Normalized Modulus of Elasticity[d] |
|---|---|---|---|
| 2a[a] | none | 10 | 1.12 |
| 2b[b] | DBE 224 (RTM)[e] | 14 | 1.32 |
| 2c[b] | DBE 821 (RTM)[f] | 17 | 1.32 |
| 2d[b] | Tegomer ME 1010 (RTM)[g] | 17.3 | 1.36 | a) Comparative Example.
b) Example according to the invention.
c) Interlayer distance determined by X-ray diffraction.
d) Normalized modulus of elasticity relative to polypropylene processed under similar conditions (=1.0).
e) DBE 224® is dimethylsiloxane-ethylene oxide-block copolymer (25% non siloxane, MW 10000), commercially available from ABCR GmbH & Co KG (Karlsruhe, Germany).
f) DBE 821® is dimethylsiloxane-ethylene oxide-block copolymer (85% non siloxane, MW3600), commercially available from ABCR GmbH & Co KG (Karlsruhe, Germany).
g) Tegomer ME 1010® is polymethyl methacrylate-block-polyoxyethylene copolymer, commercially available from Goldschmidt AG (Essen, Germany).

The X-ray diffraction (XRD) spectra show that all non-ionic surfactants according to Table 2 intercalate the used clay in the direct melt blending experiments in the batch mixer. This is demonstrated by an increase in d-spacing—the spacing between clay layers—from 10 Å to 14-17 Å. The elasticity modulus of samples is enhanced 32-36% over polypropylene.

EXAMPLE 3

Preparation of Polypropylene Nanocomposites in a Batch Mixer

Nanocomposites were prepared as described in Example 1 but with 2.5% of a non-ionic surfactant according to Table 3.

TABLE 3

| Example | Non-ionic surfactant | d-001 in Å[c] | Normalized Modulus of Elasticity[d] |
|---|---|---|---|
| 3a[a] | none | 10 | 1.12 |
| 3b[b] | Sorbitan monoleate | 13.7 | 1.32 |
| 3c[b] | Sorbitan trioleate | 12 | 1.21 |
| 3d[b] | Sorbitan monostearate | 13.7 | 1.36 |
| 3e[b] | Ethoxylated sorbitan ester[e] | 12 | 1.16 | a) Comparative Example.
b) Example according to the invention.
c) Interlayer distance determined by X-ray diffraction.
d) Normalized modulus of elasticity relative to polypropylene processed under similar conditions (=1.0).
e) Ethoxylated sorbitan ester is a compound of the formula IIa

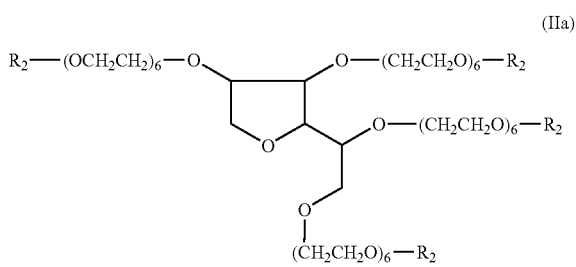

(IIa)

wherein $R_2$ is $C_{18}$alkanoyl.

The X-ray diffraction (XRD) spectra show that all non-ionic surfactants according to Table 3 intercalate the used clay in the direct melt blending experiments in the batch mixer. This is demonstrated by an increase in d-spacing—the spacing between clay layers—from 10 Å to 12-14 Å. The elasticity modulus of samples is enhanced 16-36% over polypropylene.

EXAMPLE 4

Preparation of Polypropylene Nanocomposites in a Twin Screw Extruder

Processing is carried out with a Japan Steel Works 30 mm diameter twin screw extruder of L/D ratio 42 (JSW TEX 30) that comprises ten temperature controlled barrel sections each with L/D of 3.5, three unheated sampling zones with L/D 1.167, and a cooled feed block with L/D 3.5. The screw configuration consists of a combination of mixing, kneading and conveying elements familiar to those skilled in the art. Materials are fed into the extruder via a JSW TTF20 gravimetric feeder (Feed 1) and a K-Tron KQX gravimetric feeder (Feed 2). The JSW TEX 30 is operated in a co rotating (intermeshing self wiping) mode with throughput of 10 kg/hr and a screw speed of 200 rpm. Vacuum venting is applied to the final barrel section. The extrudate is cooled in a water filled strand bath and pelletized.

In a first step a 25 wt % clay masterbatch is prepared. Feed 1 comprises a dry blend of polypropylene [Basell HP400N®] and a stabilizer which is composed of 0.25 wt % of Irganox 1010® (pentaerythritol tetrakis[3-(3,5-di-tert-butyl-4-hydroxyphenyl)propionate]) and 0.25 wt % of Irgafos 168® (tris(2,4-di-tert-butylphenyl)phosphite). Feed 2 comprises a blend of the clay [Cloisite (Na$^+$)® obtained from Southern Clay Industries] and the non-ionic surfactant in the ratio defined in Table 4. All barrel sections are heated to 170° C.

In the second step the masterbatch is let down to the required clay level (see Table 4) by blending the masterbatch (Feed 2) with further polypropylene plus stabilizer (Feed 1). The first barrel section is heated at 180° C. the remaining barrel sections are heated at 200° C.

Injection moulding of the extruded samples are preformed with a Cincinnati Milacron VS55 28 mm diameter injection moulding machine comprising four temperature controlled sections of L/D23/1. The machine is operated at a clamp force of 50 tons and at a maximum injection pressure of 2005 bar.

Tensile testing is performed according to ISO 521 using an Instron 5500R material tensile tester. Normalised tensile properties (vs polypropylene=1.0) for nanocomposite prepared with a ratio of non-ionic surfactant:clay of 1:2. The results are summarized in Table 4.

TABLE 4

| Example | Amount of Cloisite | Non-ionic surfactant | Tensile Strength[c] | Normalized Modulus of Elasticity[d] |
|---|---|---|---|---|
| 4a[a] | 1% | none | 1.07 | 1.08 |
| 4b[b] | 1% | 0.5% PE-b-PEO (MW 575)[e] | 1.09 | 1.14 |
| 4c[a] | 3% | none | 1.07 | 1.13 |
| 4d[b] | 3% | 1.5% PE-b-PEO (MW 575)[e] | 1.08 | 1.19 |
| 4e[a] | 5% | none | 1.09 | 1.25 |
| 4f[b] | 5% | 2.5% PE-b-PEO (MW 575)[e] | 1.10 | 1.28 | a) Comparative Example.
b) Example according to the invention.
c) Interlayer distance determined by X-ray diffraction.
d) Normalized tensile strength relative to polypropylene processed under similar conditions (=1.0).
e) PE-b-PEO (MW 575) is a linear polyethylene-block-poly(ethylene oxide) of the formula I, wherein m is 1, n is 1, average x is 33, average y is 2-3, z is 0, and $R_1$ is hydrogen.

All examples of Table 4 demonstrate that the mechanical properties can be improved compared to conventional nanocomposites by using non-ionic surfactant nanocomposites according to the present invention.

EXAMPLE 5

Preparation of Polypropylene Nanocomposites in a Twin Screw Extruder

The following examples demonstrate an optimal segment length to achieve tensile properties with a linear non-ionic surfactant additive. The greatest improvement in tensile properties is observed with linear surfactant [PE-b-PEO (MW 575)] with very short PEO segment (~2-3 E0 units) and a comparatively short hydrocarbon segment (~30 carbons). Similar property improvements are observed with natural (Cloisite Na$^+$) and synthetic clays (Somasif ME100).

The process conditions are similar to Example 4 but additive dry blended with clay at room temperature and a 10% clay masterbatch is prepared. The results are summarized in Table 5.

TABLE 5

| Example | Clay | Non-ionic surfactant | Tensile Strength[c] | Normalized Modulus of Elasticity[d] |
|---|---|---|---|---|
| 5a[a] | 5% Cloisite Na+ | None | 0.99 | 1.09 |
| 5b[b] | 5% Cloisite Na+ | 1% PE-b-PEO (MW 1400)[e] | 1.05 | 1.06 |
| 5c[b] | 5% Cloisite Na+ | 1% PE-b-PEO (MW 920)[f] | 1.04 | 1.05 |
| 5d[b] | 5% Cloisite Na+ | 1% PE-b-PEO (MW 875)[g] | 1.01 | 1.11 |
| 5e[b] | 5% Cloisite Na+ | 1% PE-b-PEO (MW 575)[h] | 1.02 | 1.17 |
| 5f[b] | 5% Somasif ME100 | 1% PE-b-PEO (MW 575)[h] | 1.04 | 1.17 |
| 5g[a] | none | 1% PE-b-PEO (MW 575)[h] | 1.00 | 0.95 | a) Comparative Example.
b) Example according to the invention.
c) Normalized tensile strength relative to polypropylene processed under similar conditions (=1.0).
d) Normalized modulus of elasticity relative to polypropylene processed under similar conditions (=1.0).
e) PE-b-PEO (MW 1400) is a linear polyethylene-block-poly(ethylene oxide) of the formula I, wherein m is 1, n is 1, average x is 50, average y is 15, z is 0, and $R_1$ is hydrogen.
f) PE-b-PEO (MW 920) is a linear polyethylene-block-poly(ethylene oxide) of the formula I, wherein m is 1, n is 1, average x is 32, average y is 10, z is 0, and $R_1$ is hydrogen.
g) PE-b-PEO (MW 875) is a linear polyethylene-block-poly(ethylene oxide) of the formula I, wherein m is 1, n is 1, average x is 50, average y is 4, z is 0, and $R_1$ is hydrogen.
h) PE-b-PEO (MW 575) is a linear polyethylene-block-poly(ethylene oxide) of the formula I, wherein m is 1, n is 1, average x is 33, average y is 2-3, z is 0, and $R_1$ is hydrogen.

EXAMPLE 6

Preparation of Polypropylene Nanocomposites in a Twin Screw Extruder

The following examples demonstrate the use of poly(dimethylsiloxane) (PDMS) based non-ionic surfactants. The greatest improvement in tensile properties is observed with low molecular weight polymer with short PDMS segment (DBE-712) at a 1% level with respect to polypropylene. With DBE-712 properties decrease with higher additive, levels.

The samples are prepared using process conditions similar to Example 4 but the additive is premixed with clay at 80° C. and a 10% clay masterbatch is prepared in step 1. The results are summarized in Table 6.

TABLE 6

| Example | Non-ionic surfactant | Tensile Strength[c] | Normalized Modulus of Elasticity[d] | Elongation at break[e] | Tensile Impact Strength[f] |
|---|---|---|---|---|---|
| 6a[a] | none | 1.05 | 1.26 | 1.0 | 1.14 |
| 6b[b] | 1% DBE-712[g] | 1.08 | 1.19 | 1.81 | 1.41 |
| 6c[b] | 2.5% DBE-712[g] | 1.04 | 1.11 | 2.70 | 1.41 | a) Comparative Example.
b) Example according to the invention.
c) Normalized tensile strength relative to polypropylene processed under similar conditions (=1.0).
d) Normalized modulus of elasticity relative to polypropylene processed under similar conditions (=1.0).
e) Normalized elongation at break relative 5% clay, no non-ionic surfacant (a) nonocomposite (=1.0).
f) Normalized tensile impact strength relative to polypropylene processed under similar conditions (=1.0).
g) DBE-712 is PDMS-PEO block (25/75).

EXAMPLE 7

Thermal Stability Under Air and Nitrogen of Polypropylene Nanocomposites

The following data demonstrate that samples prepared with a non-ionic surfactant additive [PE-b-PEO (MW 575)] have significantly greater thermal stability under air than either polypropylene or polypropylene plus unmodified clay. Under nitrogen the thermal stability is not reduced with respect to polypropylene. It is known that the thermal stability of conventional nanocomposites based on organic modified clays and polypropylene-graft-rnaleic anhydride is significantly reduced with respect to polypropylene.

The samples (~10 mg, cryoground powder) are heated from 50 to 500° C. at 10° C./min in a Mettler thermobalance T6A/SDTA851 equipped with a T50 801 sample robot under air or under nitrogen atmosphere. Onset and end temperatures are calculated by the tangent method. The results are summarized in Table 7.

TABLE 7

| Example | Material | $T_{onset}$ ° C. | $T_{end}$ ° C. | $T_{max}$ ° C. | Residual weight, % |
|---|---|---|---|---|---|
| 7a[a] | Polypropylene | 280 | 390 | 380 | 0.6 |
| 7b[a] | No non-ionic surfactant[c] | 269 | 388 | 381 | 6.1 |
| 7c[b] | PE-b-PEO (MW 575)[d] | 275 | 409 | 402 | 6.2 | a) Comparative Example.
b) Example according to the invention.
c) Sample prepared as in Example 5a
d) Sample prepared as in Example 5e

EXAMPLE 8

Plate-and-Plate Oscillatory Rheology

The viscosity of the samples is slightly reduced with respect to polypropylene. Conventional organic modified clays and derived nanocomposites have significantly increased viscosity. The nanocomposites of the present invention are more readily processed than conventional nanocomposites based on organic modified clays.

The melt behavior of the blends and neat components in the low shear rate (frequency) range is studied using a dynamic rheometer ARES (Advanced Rheometric Expansion Systems). Measurements are performed in the plate-plate configuration with a gap of 1.5 to 2.0 mm. Specimens are disks with diameter of 25 mm cut from the approximately 2 mm thick sheets prepared by compression molding. Frequency sweep experiments are performed on each of the materials over a frequency range of 0.1 to 100 rad/s, with data collected at five points per decade. Temperature of the experiments is set at 200° C., corresponding to the temperature of the composite preparation. The results are summarized in Table 8.

TABLE 8

| Example | Stabilized Polypropylene | Cloisite Na+ | Non-ionic surfactant | Complex Viscosity, Pa·s @ 200° C. for frequency [rad/sec] | | | |
|---|---|---|---|---|---|---|---|
| | | | | 0.1 | 1.0 | 10 | 100 |
| 8a[a] | 100% alone | none | none | 3060 | 2320 | 1145 | 385 |
| 8b[a] | 100% alone (processed) | none | none | 3160 | 2340 | 1170 | 395 |
| 8c[a] | 95% | 5% | none | 2985 | 1945 | 940 | 315 |
| 8d[b] | 94% | 5% | 1% PE-b-PEO (MW 575)[c] | 2975 | 2150 | 1065 | 360 |
| 8e[b] | 94% | 5% | 1% PE-b-PEO (MW 875)[d] | 3060 | 2025 | 980 | 330 |
| 8f[b] | 94% | 5% | 1% PE-b-PEO (MW 920)[e] | 3065 | 2010 | 970 | 325 |

TABLE 8-continued

| Example | Stabilized Polypropylene | Cloisite Na+ | Non-ionic surfactant | Complex Viscosity, Pa · s @ 200° C. for frequency [rad/sec] | | | |
|---|---|---|---|---|---|---|---|
| | | | | 0.1 | 1.0 | 10 | 100 |
| 8g[b] | 94% | 5% | 1% PE-b-PEO (MW 1400)[f] | 3185 | 2100 | 1020 | 340 | a) Comparative Example.
b) Example according to the invention.
c) PE-b-PEO (MW 575) is a linear polyethylene-block-poly(ethylene oxide) of the formula I, wherein m is 1, n is 1, average x is 33, average y is 2-3, z is 0, and $R_1$ is hydrogen.
d) PE-b-PEO (MW 875) is a linear polyethylene-block-poly(ethylene oxide) of the formula I, wherein m is 1, n is 1, average x is 50, average y is 4, z is 0, and $R_1$ is hydrogen.
e) PE-b-PEO (MW 920) is a linear polyethylene-block-poly(ethylene oxide) of the formula I, wherein m is 1, n is 1, average x is 32, average y is 10, z is 0, and $R_1$ is hydrogen.
f) PE-b-PEO (MW 1400) is a linear polyethylene-block-poly(ethylene oxide) of the formula I, wherein m is 1, n is 1, average x is 50, average y is 15, z is 0, and $R_1$ is hydrogen.

EXAMPLE 9

Long-Term Thermal Stability of Polypropylene Nanocomposites

In a first step a 10 wt % clay masterbatch, consisting of Profax®PH 350 (BaselI Polyolefins, Germany), 0.25 wt % of Irganox B225® [1:1 mixture of Irganox 1010® (pentaerythritol ester of 3-(3,5-di-tert-butyl-4-hydroxyphenyl)propionic acid) and Irgafos 168® (tris(2,4-di-tert-butylphenyl)phosphite)], Cloisite (Na+) [® obtained from Southern Clay Industries] and the non-ionic surfactant in the ratio defined in Table 9, is prepared on a Werner&Pfleiderer twin-screw extruder (ZSK25) at a temperature of at most 200° C.

In the second step the masterbatch is let down to the required clay level (Table 9) by blending the masterbatch (Feed 2) with further polypropylene plus stabilizer (Feed 1). The first barrel section is heated at 180° C. the remaining barrel sections are heated at 200° C.

Injection moulding of the extruded samples are preformed with a Arburg 320 S at a temperature of 230° C.

Tensile testing is performed according to ISO 521 using an Instron 5500R material tensile tester.

The oven aging of the test panels is carried out in a Memmert convection oven at 135° C. The test panels are subjected to artificial aging at 135° C. in a fan-assisted oven until they become brittle. The results respectively days until embrittlement are summarized in Table 9.

TABLE 9

| Example | % Cloisite | Non-ionic surfactant | Days until Embrittlement[c] [d] | Tensile Modulus[d] |
|---|---|---|---|---|
| 9a[a] | 5 | none | 19 | 1.07 |
| 9b[b] | 5 | 2.5% PE-b-PEO (MW 575)[e] | >42 | 1.09 |
| 9c[b] | 5 | 2.5% Aduxol GA10-03[f] | >42 | 1.10 | a) Comparative Example.
b) Example according to the invention.
c) Oven aging at 135° C.
d) Normalized modulus of elasticity relative to polypropylene processed under similar conditions (=1.0).
e) PE-b-PEO (MW 575) is a linear polyethylene-block-poly(ethylene oxide) of the formula I, wherein m is 1, n is 1, average x is 33, average y is 2-3, z is 0, and $R_1$ is hydrogen.
f) Aduxol GA10-03 is the compound of the formula Ie

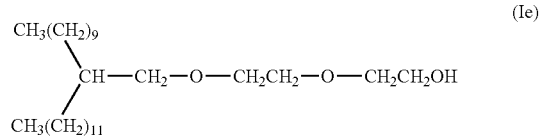

(Ie)

The presence of a non-ionic surfactant improves the long-term thermal stability from 19 days (nanocomposite without non-ionic surfactant) to more than 42 days.

EXAMPLE 10

Hydrotalcite Based Polypropylene Nanocomposites

Nanocomposites are prepared as described in Example 9 but with 5% Hydrotalcite [Hycite 713®] instead of the clay [Cloisite (Na+)® obtained from Southern Clay Industries].

TABLE 10

| Example | % Hycite 713 | Non ionic surfactant | Elongation at break[c] | Tensile Modulus[d] |
|---|---|---|---|---|
| 10a[a] | 5 | — | 0.88 | 1.07 |
| 10b[b] | 5 | 1% Aduxol GA8-03[e] | 1.09 | 1.30 |
| 10c[b] | 5 | 1% Nafol 1822C + 2EO[f] | 1.02 | 1.33 |
| 10d[b] | 5 | 1% Tegomer 1010[g] | 1.00 | 1.45 | a) Comparative Example.
b) Example according to the invention.
c) Normalized tensile strength relative to polypropylene processed under similar conditions (=1.0).
d) Normalized modulus of elasticity relative to polypropylene processed under similar conditions (=1.0).
e) Aduxol GA8-03 is a compound of the formula 1d

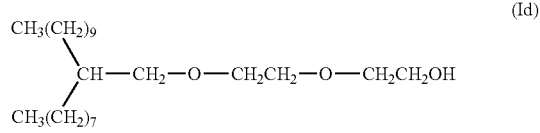

(Id)

f) Nafol 1822+2EO is a linear polyethtlene-block-poly(ethylene oxide) of the formulaI

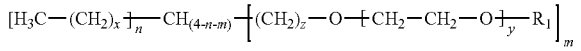

(I)

wherein m is 1, n is 1, average x is 20, average y is 2, z is 0, and $R_1$ is hydrogen.

g) Tegomer ME 1010® is polymethyl methancrylate-block-polyoxyethylene copolymer, commercially available from Goldschmidt AG (Essen, Germany).

The Examples demonstrate the improved properties of hydrotalcite polypropylene nanocomposites containing non-ionic surfactants. The tensile modulus was improved by up to 45% whereas the elongation at break was retained at the value of the used polypropylene.

EXAMPLE 11

Physical Properties of Lope Nanocomposite Films

A LDPE nanocomposite compound is prepared on a Haake TW100 extruder at a temperature of at most 180° C. The compound consisted of (Lupolen® 2420F 350, Basell Polyolefins, Germany), 0.1 wt % of Irganox B921® [1:2 mixture of Irganox 1076 (n-octadecyl 3-[3,5-di-tert-butyl-4-hydroxphenyl]propionate) and Irgafos 168® (tris(2,4-di-tert-butylphenyl)phosphite)], 4% of clay [Cloisite (20A)® obtained from Southern Clay Industries or Somasif ME100® obtained from CO-OP Chemical Co., LTD.) and a non-ionic surfactant in the ratio defined in Table 11.

A LDPE film is blown on the Haake TW100 with a ring dye of 25 mm at a temperature of 200° C. LDPE films of about 50-80 μm are obtained. The oxygen permeability measurements are carried out on an instrument of Modern Controls Inc. according to DIN 53380, part 3. The results are summarized in Table 11.

TABLE 11

| Example | % Clay | Non-ionic surfactant | Thickness[c] [mm] | Oxygen Permeability[d] |
|---|---|---|---|---|
| 11a[a] | no clay | | 0.053 | 1 |
| 11b[b] | 4% Cloisite 20A | 1% Aduxol GA8-03[e] | 0.059 | 0.70 |
| 11c[b] | 4% Somasif ME100 | 1% Aduxol GA8-03[e] | 0.061 | 0.63 | a) Comparative Example.
b) Example according to the invention.
c) Thickness of the prepared LDPE films.
d) Normalised oxygen permeability (vs polypropylene=1.0)
e) Aduxol GA8-03 is a compound of the formula Id

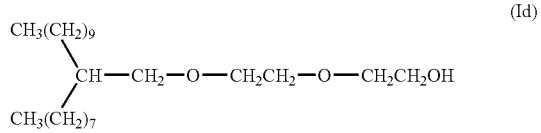

(Id)

The oxygen gas permeability of non-ionic surfactant containing LDPE nanocomposite is reduced by about 37% compared to pure LDPE films. Furthermore the optical properties respectively transparency of the LDPE films is improved by adding non-ionic surfactants.

What is claimed is:

1. A process for the preparation of a polyolefin nanocomposite which comprises melt mixing a mixture of a) a polyolefin, b) a filler and c) a poly(methyl methacrylate)-block-poly(oxyethylene) copolymer non-ionic surfactant,
   wherein the filler is a natural or synthetic phyllosilicate or a mixture of such phyllosilicates or a layered hydroxycarbonate and where the filler is an unmodified filler and wherein the weight ratio of components c) to b) is from 1:10 to 1:2.

2. A process according to claim 1, wherein the filler is a layered silicate clay or a layered hydroxycarbonate.

3. A process according to claim 1, wherein the filler is a montmorillonite, bentonite, beidel-lite, mica, hectorite, saponite, nontronite, sauconite, vermiculite, ledikite, magadite, kenyaite, stevensite, volkonskoite, hydrotalcite or a mixture thereof.

4. A process according to claim 1, wherein the polyolefin is polyethylene or polypropylene or copolymers thereof.

5. A process according to claim 1, wherein the filler is present in an amount of from 1 to 15%, based on the weight of the polyolefin.

6. A process according to claim 1, wherein the non-ionic surfactant is present in an amount of from 0.1 to 7.5%, based on the weight of the polyolefin.

7. A process according to claim 1, wherein the melt mixing occurs between 120 and 290° C.

8. A process according to claim 1 comprising melt mixing components (a), (b), (c) and further additives.

9. A process according to claim 8, wherein the further additives are selected from the group consisting of phenolic antioxidants, light-stabilizers, processing stabilizers, pigments, dyes, plasticizers, compatibilizers, toughening agents, thixotropic agents, levelling assistants, acid scavengers and metal passivators.

10. A process according to claim 1, wherein the mixture of the filler and the non-ionic sur-factant, and where applicable further additives, are added to the polyolefin in the form of a master batch which contains the mixture in a concentration of from 2.5 to 40% by weight.

11. A process according to claim 1, further comprising melt mixing 0.01 to 10% by weight of a nucleating agent.

12. An article comprising a polyolefin nanocomposite prepared according to claim 1.

13. A nanocomposite comprising a melt mixture of
   a) a polyolefin which is susceptible to oxidative, thermal or light-induced degradation,
   b) a filler,
   c) a poly(methyl methacrylate)-block-poly(oxyethylene) copolymer non-ionic surfactant and
   d) an additive selected from the group consisting of phenolic antioxidants, light-stabilizers, processing stabilizers, pigments, dyes, plasticizers, compatibilizers, toughening agents, thixotropic agents, levelling assistants, acid scavengers, metal passivators and mixtures thereof,
   wherein the filler is a natural or synthetic phyllosilicate or a mixture of such phyllosilicates or a layered hydroxycarbonate and where the filler is an unmodified filler and wherein the weight ratio of components c) to b) is from 1:10 to 1:2.

* * * * *